G. N. STEARNS.

HOLLOW AUGER.

No. 7,484.

Reissued Jan. 30, 1877.

Attest:

A. A. Yeatman

M. Gardner

Inventor:

George N. Stearns by George H. Fey

Attorney

N. PETERS, PHOTO-LITHOGRAPHER, WASHINGTON, D. C.

UNITED STATES PATENT OFFICE.

GEORGE N. STEARNS, OF SYRACUSE, NEW YORK.

IMPROVEMENT IN HOLLOW AUGERS.

Specification forming part of Letters Patent No. 39,841, dated September 8, 1863; antedated January 16, 1863; reissue No. 7,484, dated January 30, 1877; application filed August 31, 1876.

*To all whom it may concern:*

Be it known that I, GEORGE N. STEARNS, of the city of Syracuse, in the county of Onondaga, State of New York, have invented a certain new and useful Improvement in Hollow Augers, for cutting tenons upon the outer ends of wagon-spokes or other similar articles; and I do hereby declare the following to be such a clear and exact description as will enable any person skilled in the art to which it pertains to construct the same, reference being had to the accompanying drawings, forming a part of this specification, and to the letters of reference marked thereon, like letters indicating corresponding parts in the different figures.

This invention relates to the class of hollow augers designed for cutting tenons of different sizes by one and the same auger; the object being to avoid the necessity of using a separate auger for each tenon, varying only in its diameter.

Experience also demonstrates that there is a perceptible variance in the diameter of boring-bits manufactured by different makers; hence it is essential and desirable, in producing an adjustable hollow auger, to provide in the device means to compensate for this difference in the gage of the boring-bits of various makers, and at the same time to make it effective on each sized tenon within its scope, thus producing an auger which shall combine in itself a full set of the ordinary hollow augers now in use. This I claim to have accomplished in the hollow auger hereinafter fully described, and then specifically set forth in the claims.

Figure 1:
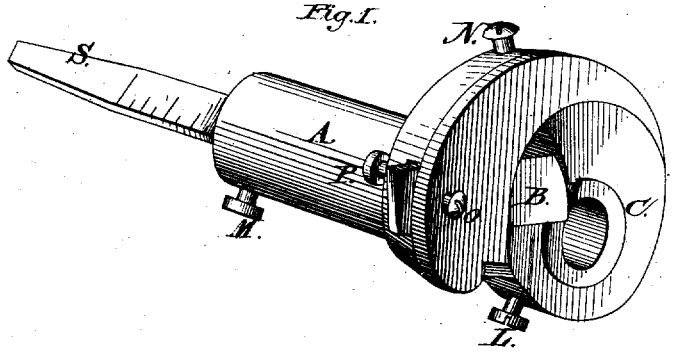
Figure 2:
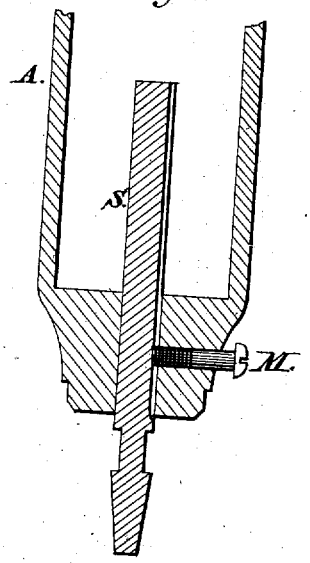
Figure 3:
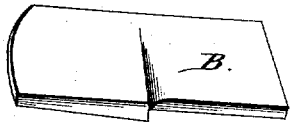
Figure 4:
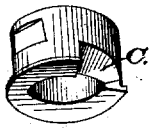

In the drawings, Figure 1 is a perspective view of the auger complete. Fig. 2 represents a section of the body, showing the shank, forming an adjustable stop. Fig. 4 represents one of the adjustable thimbles detached. Fig. 3 represents the knife or cutter detached.

The body (shown at A) consists of an elongated metallic cylinder, having in its lower end a circular orifice, through which the shank passes. The upper end is provided with a larger circular orifice, forming a bearing on the spoke as the auger cuts, and for receiving the adjustable thimble hereinafter described. The body is provided with an adjustable shank, which is left square. In order to provide sufficient strength in the body, it is preferably made of cast-iron or brass. At the upper end of the body, opposite the shank, the mortised shoulder confining the cutter is secured by two arms, cast on. The mouth of the auger is circular, and is designed to receive the adjustable thimbles C, differing only in the diameter of their internal apertures, by means of which the different-sized tenons are formed. The thimbles are provided with a notch cut into their upper surface, which forms a throat between the knife and thimble, allowing the chip to escape, and to permit a vertical adjustment of the knife or cutter. The thimble is held in place by the screw L.

In order to regulate the length of the tenon, I provide the adjustable stop S, which is formed by making the shank, before mentioned, of sufficient length to reach within an inch or so of the thimble when it is inserted to its full extent in the body of the auger. If a longer tenon is required, it is simply necessary to withdraw the shank to any desired point, where it can be held in position by an ordinary screw as shown in the drawing, Fig. 2.

It will be readily observed that by loosening the screw the stop may be moved to any desired point in the length of the body, and there retained by tightening the screw. In this manner the length of the tenons can be determined, and the same provides an effective device for this purpose.

The knife or cutter B is movable, and is made of sufficient length to conform to the different-sized thimbles, and is so attached as to admit of a quick and convenient minute adjustment to the slight variations in the diameter of different bits, as before spoken of.

In order to set the knife or cutter in the mortise as firmly as heavy work requires, I secure it by the set-screws P, O, and N; and in order to attain readily the minute adjustment of the cutter necessary to adapt the size of the tenon to the slight variations of bits intended to be the same size, I find a peculiar arrangement of the set-screw necessary—the set-screws P and O being near the outer end of the cutter, and so as to act as a center of motion, upon which the inner end of the cutter may be moved and adjusted in the most convenient and accurate manner by the set-screw N. This arrangement of the set-screws secures the cutter firmly for the heaviest kind of work, and admits of a minute adjustment of the point of the cutter to the slightest variation in the size of the bit.

I make the mortise through the shoulder considerably wider than the thickness of the knife or cutter, in order to permit a lateral or sidewise adjustment of the knife to vary the thickness of chip or rapidity of cut, and I adjust this by means of the set-screws P and O, and by them hold the cutter in any position desired for this purpose.

The set-screw N is also convenient for adjusting the point of the cutter to compensate for its wear in use, and to vary its point laterally for the minute adjustment above described; and for this purpose, and also to obtain a drawing cut, I locate my cutter so that its edge will stand at an angle of about forty-five degrees from a line extending from its point to the center of the thimbles. By this means a drawing cut is obtained, and also a very convenient lateral adjustment of the point of the knife.

Having thus fully described my invention, I claim as new, and desire to secure by Letters Patent, the following:

1. The mortise for confining the cutter and sustaining and locating the cutter by the screws P, O, and N, so as to obtain the longitudinal, vertical, and lateral adjustment, and the drawing cut, substantially as and for the purposes specified.

2. An adjustable stop and shank formed in one piece, moving in a hollow-auger body, held by a screw, substantially as and for the purposes specified.

GEO. N. STEARNS.

Witnesses:
ORLANDO HILL,
J. NEAL PERKINS.